United States Patent [19]

Ishiwata

[11] Patent Number: 4,671,065
[45] Date of Patent: Jun. 9, 1987

[54] MASTER CYLINDER

[75] Inventor: Ichiro Ishiwata, Yokosuka, Japan

[73] Assignee: Nippon Air Brake Co., Ltd., Japan

[21] Appl. No.: 801,062

[22] Filed: Nov. 22, 1985

[30] Foreign Application Priority Data

Dec. 19, 1984 [JP] Japan ................... 59-267728

[51] Int. Cl.$^4$ ............................................. F15B 7/00
[52] U.S. Cl. ......................................... 60/533; 92/169; 92/170
[58] Field of Search ................. 60/533, 585, 589, 592; 92/169.2, 170

[56] References Cited

U.S. PATENT DOCUMENTS

| | | | |
|---|---|---|---|
| 3,228,347 | 1/1966 | Corsette | 92/170 |
| 3,237,571 | 3/1966 | Corsette | 92/170 |
| 3,672,263 | 6/1972 | Mirjanie | 92/144 |
| 4,505,112 | 3/1985 | Nakamura | 60/585 |
| 4,528,895 | 7/1985 | Nakamura | 60/589 |
| 4,565,066 | 1/1986 | Weiler | 60/585 |

Primary Examiner—Abraham Hershkovitz
Attorney, Agent, or Firm—Kane, Dalsimer, Kane, Sullivan and Kurucz

[57] ABSTRACT

A master cylinder includes a cylinder of one-piece construction made of a synthetic resin and including a cylinder body having an axial internal bore therein. At least one mounting flange extends perpendicular to an axis of the cylinder body, the mounting flange being adapted to be secured to a support structure to mount the master cylinder thereon. A plurality of ribs are formed integrally with and extends radially outwardly from the outer peripheral surface of the cylinder body in circumferentially spaced relation, the ribs also extending along the axis of the cylinder body. The mounting flange is connected to radial outer ends of the ribs. A piston received in the internal bore for sliding movement therealong.

4 Claims, 2 Drawing Figures

MASTER CYLINDER

BACKGROUND OF THE INVENTION

1. Field of the Invention

This invention relates generally to a master cylinder for a brake or a clutch system of a vehicle and more particularly to such a master cylinder including a molded cylinder of a synthetic resin.

2. Prior Art

Generally, a master cylinder of the type described above comprises a cylinder body of a tubular shape and a pair of mounting flanges formed on an outer peripheral surface of the cylinder body and extending perpendicularly to the axis of the cylinder body, the mounting flanges being adapted to be fixed to a support structure such as a dashboard of an automotive vehicle to mount the master cylinder thereon. A piston is received in the cylinder body for sliding movement therealong. In the case where the cylinder body and the mounting flanges are made of a synthetic resin, they are formed as a one-piece molded construction. The mounting flanges are relatively to provide an increased mechanical strength. Therefore, such thick mounting flanges are subjected to shrinkage, so that the inner peripheral surface of the cylinder body is recessed at a portion corresponding to the connecting portions of the mounting flanges. The piston is not sealingly moved along the internal bore of the cylinder body because of the presence of such a recess. For this reason, conventionally, the piston is adapted to be slidingly moved along that portion of the internal bore other than the recessed portion thereof. As a result, the cylinder body of a synthetic resin is longer than that of metal.

Another known master cylinder as disclosed in U.S. Pat. No. 4,505,112 comprises a cylinder body of a synthetic resin, an outer tubular portion disposed in spaced, concentric relation to the cylinder body and a connecting portion interconnecting the forward end of the tubular portion and the outer peripheral surface of the cylinder body. The piston is movable along the cylinder body between a point disposed rearwardly of the connecting portion and a point adjacent to the rearward end of the cylinder body. With this construction, the length of the cylinder body is reduced by virtue of the provision of the tubular portion. However, the piston is also adapted to be moved along that portion of the internal bore of the cylinder body other than the connecting portion since the internal bore is recessed at a portion corresponding to the connecting portion. This limits the design of the master cylinder, and particularly the mounting flanges can not be spaced away from the connecting portion so much. If so, the strength of the tubular portion is not sufficient to support the mounting flanges.

SUMMARY OF THE INVENTION

It is therefore an object of this invention to provide a master cylinder of the type in which the internal bore of the cylinder body is not recessed during its molding operation, so that the piston can be sealingly moved therealong even at that portion of the internal bore corresponding to the mounting flanges, thereby enabling a more free design of the master cylinder.

According to the present invention, there is provided a master cylinder comprising:

(a) a cylinder of one-piece construction made of a cynthetic resin and including (i) a cylinder body having an axial internal bore therein; (ii) mounting flange means having at least one mounting flange extending perpendicular to an axis of said cylinder body, said mounting flange being adapted to be secured to a support structure to mount said master cylinder thereon; and (iii) a plurality of ribs formed integrally with and extending radially outwardly from the outer peripheral surface of said cylinder body in circumferentially spaced relation, said ribs also extending along the axis of said cylinder body, and said mounting flange being connected to radial outer ends of said ribs; and (b) a piston received in said internal bore for sliding movement therealong.

DESCRIPTION OF THE PREFERRED EMBODIMENT OF THE INVENTION

Figure 1:
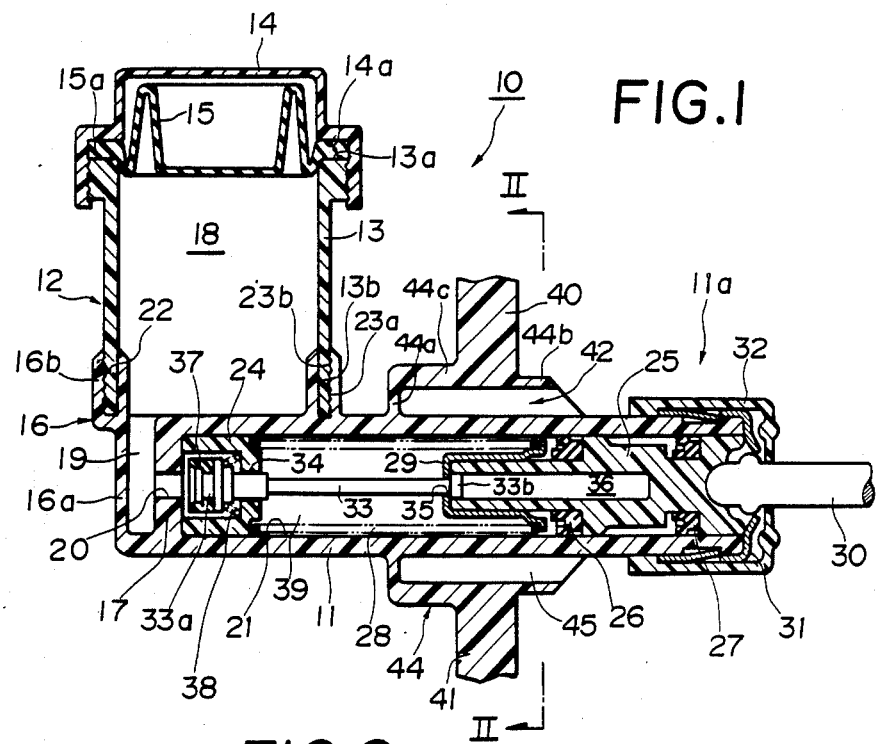
FIG. 1 is a cross-sectional view of a master cylinder provided in accordance with the present invention.

A master cylinder 10 shown in FIG. 1 comprises a cylinder 11a and a reservoir 12 for holding a fluid. The reservoir 12 includes a tubular body 13 which is molded of a thermoplastic material such as polyamide resin since it is preferred that the reservoir body 13 should be transparent to enable the inspection of the amount of the fluid from outside the reservoir body 13. The cylinder 11a of a one-piece molded construction comprises a cylinder body 11 and is made of a fiber-reinforced thermoplastic material, such as a glass fiber-reinforced thermoplastic meterial, to provide an increased mechanical strength. Since the cylinder 11a is made of a fiber-reinforced thermoplastic material, it is all the more important that the internal bore 21 of the cylinder body 11 is not recessed due to shrinkage during the molding since such a molded product is rather difficult to be processed or cut because of the presence of the reinforcement fiber. If the internal surface is processed, the fibers may be exposed, so that the piston movable therealong is damaged. However, the cylinder body 11 may be made of the same material as the reservoir body 13.

A cap 14 of a synthetic resin is threaded on an upper open end of the reservoir body 13, and a diaphragm 15 of a flexible material such as rubber is received in the cap 14 with its peripheral bead 15a held between an upper end surface 13a of the reservoir body 13 and a stepped portion 14a of the cap to seal the interior of the reservoir body 13. For molding the master cylinder 10, the reservoir body 13 is first molded, and the molded body 13 is then placed in position in a mold for producing the cylinder body 11. Then, the cylinder body 11 is molded, so that the reservoir body 13 is integral with the molded cylinder body 11. The cylinder body 11 has a tubular mounting portion 16 formed at a front end thereof and extending perpendicular to the axis of the cylinder body 11. A front wall 16a of the mounting portion 16 is disposed forwardly of the front end wall or bottom 17 of the cylinder body 11 to provide a space 19 therebetween. The space 19 and a space 18 defined by the interior of the reservoir body 13 serve to hold the fluid. The space 19 communicates with the internal bore 21 of the cylinder body 13 via a port 20 formed through the end wall 17. An annular groove 22 is formed in the tubular mounting portion 16, and the lower end 13b of the reservoir body 13 is received in the annular groove 22. The outer surface of the lower end 13b and the wall of the groove 22 mated therewith have complementarily-formed alternate ridge and grooves 23a and 23b to provide an increased bonding strength.

A valve casing 24 and the piston 25 are received in the front and rear portions of the internal bore 21 of the cylinder body 11, respectively, for sliding movement therealong. A pair of seal rings 26 and 27 are mounted around the piston 25, so that the piston 25 is slidable along the internal bore 21 liquid-tight. A cup-shaped retainer 29 is mounted on the front end of the piston 25. A compression coil spring 28 is received in the internal bore 21 and acts between the rear end of the valve case 24 and the retainer 29, so that the valve case 24 is urged by the coil spring 28 into engagement with the front end wall 17 of the cylinder body 11. Another cup-shaped retainer 31 is secured to the rear open end of the cylinder body 11. The piston 25 is normally urged by the coil spring 28 into engagement with the retainer 31. Connected to the rear end of the piston 25 is a push rod 30 which extends through the retainer 31 and is operatively connected to a pedal (not shown). Upon depression of the pedal, the piston 25 is moved forwardly away from the retainer 31 via the push rod 30 against the bias of the coil spring 28. A cup-shaped cover member 32 through which the piston rod 30 extends is attached to the rear end of the cylinder body 11 and covers the retainer 31 to prevent foreign matters such as dust from intruding into the internal bore 21.

The valve casing 24 and the piston 25 are connected together via a connecting rod 33 received in the internal bore 21 of the cylinder body 11. The front end 33a of the connecting rod 33 extends into the valve casing 24 through a guide hole 34 formed through a base 24a of the valve casing 24, and a rear end flange 33b extends through the retainer 29 into a guide hole 36 of the piston 25. An annular valve 37 is secured to the front end 33a of the connecting rod 33. A frusto-conical compression coil spring 38 acts between the valve 37 and the base 24a of the valve casing 24 to urge the connecting rod 33 forwardly, that is, toward the front end wall 17 of the cylinder body 11, so that the rear end flange 33b is held against the retainer 29. The valve 37 is normally held in spaced relation to the front end wall 17 of the cylinder body 11. With this arrangement, when the piston 25 is slightly moved upon depression of the pedal, the valve 37 is brought into engagement with the front end wall 17 of the cylinder body 11 to close the port 20. Upon further forward movement of the piston 25 along the internal bore 21, a fluid pressure in that portion 39 of the internal bore 21 lying between the valve casing 24 and the piston 25 is increased, and this fluid pressure is transmitted via a fluid line (not shown) to a wheel cylinder (not shown).

A plurality of ribs 43 are formed integral with and extend radially outwardly from the outer peripheral surface of the cylinder body 11 in circumferentially equally spaced relation, the ribs 43 also extending longitudinally along the axis of the cylinder body 11. A tubular portion 44 surrounds the outer peripheral surface of the cylinder body 11 in spaced coaxial relation thereto to provide an annular space 42 therebetween, the tubular portion being disposed intermediate the opposite ends of the cylinder body 11. The ribs 43 extend radially between the inner peripheral surface of the tubular portion 44 and the outer peripheral surface of the cylinder body 11 and also extends axially from the front end rear ends of the tubular portion 44, so that the annular space 42 are divided into circumferentially disposed smaller spaces 45. A front end of the annular space 42 are closed by an annular end wall 44a extending between the front end of the tubular portion 44 and the outer peripheral surface of the cylinder body 11 perpendicular to the axis thereof while the rear end of the annular space 42 is open.

Figure 2:
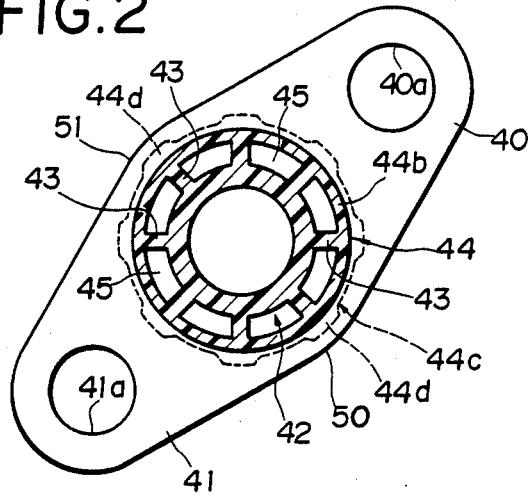
FIG. 2 is a cross-sectional view of the master cylinder taken along the line II—II of FIG. 1.

A pair of mounting flanges 40 and 41 are formed on the outer peripheral surface of the tubular portion 44 in diametrically opposite relation, the mounting flanges 40 and 41 having holes 40a and 41a, respectively. The mounting flanges 40 and 41 are adapted to be attached to a dashboard of the vehicle to mount the master cylinder 10 thereto. A common axis of the mounting flanges 40 and 41 is inclined with respect to the axis of the reservoir body 13, as best shown in FIG. 2 so that the reservoir body 13 will not interfere with the installation of the master cylinder 10 on the dashboard. A pair of mounting flanges 40 and 41 are interconnected by a pair of connective portions 50 and 51 formed on the outer peripheral surface of the tubular body 44 in diametrically opposite relation.

As described above, the cylinder 11a which includes the cylinder body 11, the ribs 43, the tubular portion 44, the front end wall 43a, the pair of mounting flanges 40 and 41 and the connective portions 50 and 51 is molded as a unitary construction. The cylinder body 11 and the ribs 43 can be molded using one mold, and each rib 43 is decreasing progressively toward the rear end of the cylinder body 11 to facilitate the release of the molded ribs 43 from the mold.

The thickness of the mounting flanges 40 and 41 is greater than the thickness of the cylinder body 11, and the ribs 43 and the tubular portion 44 are less in thickness than the cylinder body 11. The front end wall 43a connecting the tubular portion 44 to the cylinder body 11 is particularly thin since the tubular portion 44 are reinforced by the ribs 43. The front section 44c of the tubular portion 44 disposed forwardly of the mounting flanges 40 and 41 is greater in thickness than the rear section 44b disposed rearwardly of the mounting flanges 40 and 41. The front section 44c has circumferentially-spaced thickened portions 44d, and the ribs 43 correspond to the thickened portions 44d, respectively, to more positively reinforce the tubular portion 44 by the ribs 43.

When the cylinder 11a is being cooled during a molding operation thereof, the cylinder 11a is subjected to shrinkage, and a stress or force is applied to the cylinder body 11 from the pair of mounting flanges 40 and 41 of a greater thickness. However, such stress is dispersed by virtue of the provision of the ribs 43, so that the internal bore 21 of the cylinder body 11 is not recessed or indented. During the shrinkage of the cylinder 11a, the cylinder body 11 and the tubular portion 44 act on each other via the ribs 43. However, since the tubular portion 44 is less in thickness than the cylinder body 11, deformation develops mainly at the tubular portion 44, and the cylinder body 11 is not subjected to undue deformation.

While the master cylinder 10 according to the present invention has been specifically shown and described herein, the invention itself is not to be restricted by the exact showing of the drawings or the description thereof. For example, although the plurality ribs 43 are circumferentially formed around the outer peripheral surface of the cylinder body 11 at equal intervals, the ribs 43 may be arranged irregularly. For example, the ribs 43 may be arranged densely at the inner ends of the two mounting flanges 40 and 41.

As described above, by virtue of the provision of the ribs 43, the internal bore 21 of the cylinder body 11 is not recessed or deformed during the shrinkage of the cylinder 11a. Therefore, the piston 25 sealingly passes through that portion of the internal bore 21 corresponding to the pair of mounting flanges 40 and 41. Therefore, the mounting flanges 40 and 41 can be provided on the cylinder body 11 at any desired position between the reservoir body 13 and the rear end of the cylinder body 11. This enables a more free design of the master cylinder 10. Further, the cylinder body 11 can be shorter as compared with those of the conventional master cylinders.

What is claimed is:

1. A master cylinder comprising:
   (a) a cylinder of one-piece construction made of a synthetic resin and including (i) a cylinder body having an axial internal bore therein; (ii) mounting flange means having at least one mounting flange extending perpendicular to an axis of said cylinder body, said mounting flange being adapted to be secured to a support structure to mount said master cylinder thereon; and (iii) a plurality of ribs formed integrally with and extending radially outwardly from the outer peripheral surface of said cylinder body in circumferentially spaced relation, said ribs also extending along the axis of said cylinder body, and said mounting flange being connected to radial outer ends of said ribs; said cylinder has a tubular portion surrounding the outer peripheral surface of said cylinder body in spaced coaxial relation thereto, said ribs extending radially between the inner peripheral surface of said tubular portion and the outer peripheral surface of said cylinder body, said mounting flange being extending radially outwardly from said tubular portion, and said tubular portion being less in thickness than said cylinder body and
   (b) a piston received in said internal bore for sliding movement therealong, said piston is movable along the internal bore of said cylinder body in sliding contact with that portion of said internal bore corresponding to said rib.

2. A master cylinder according to claim 1, in which said cylinder has an annular end wall extending radially inwardly from one end of said tubular portion to the outer peripheral surface of said cylinder body, one said radial ends of said ribs extending to said annular end wall.

3. A master cylinder according to claim 1, in which said ribs are arranged circumferentially of said cylinder body at equal intervals.

4. A master cylinder according to claim 1, in which said cylinder is made of a reinforced plastics material.

* * * * *